(12) United States Patent
Furuichi

(10) Patent No.: US 9,255,850 B2
(45) Date of Patent: Feb. 9, 2016

(54) TEMPERATURE DETECTION CIRCUIT AND METHOD OF ADJUSTING THE SAME

(71) Applicant: LAPIS Semiconductor Co., Ltd., Tokyo (JP)

(72) Inventor: Shuji Furuichi, Tokyo (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 497 days.

(21) Appl. No.: 13/659,973

(22) Filed: Oct. 25, 2012

(65) Prior Publication Data

US 2013/0121377 A1  May 16, 2013

(30) Foreign Application Priority Data

Nov. 11, 2011 (JP) ................. 2011-247732

(51) Int. Cl.
  *G01K 7/00* (2006.01)
  *G01K 7/01* (2006.01)
  *G01K 15/00* (2006.01)

(52) U.S. Cl.
  CPC ............... *G01K 7/01* (2013.01); *G01K 15/005* (2013.01)

(58) Field of Classification Search
  CPC ........................................................ G01K 7/01
  See application file for complete search history.

(56) References Cited

U.S. PATENT DOCUMENTS

| | | | | |
|---|---|---|---|---|
| 5,422,832 A | * | 6/1995 | Moyal | 702/132 |
| 5,961,215 A | * | 10/1999 | Lee et al. | 374/178 |
| 6,501,256 B1 | * | 12/2002 | Jaussi et al. | 323/315 |
| 2007/0098042 A1 | * | 5/2007 | Choi et al. | 374/170 |
| 2008/0074172 A1 | * | 3/2008 | Marinca | 327/539 |
| 2008/0144700 A1 | * | 6/2008 | Schnaitter | 374/178 |
| 2010/0188141 A1 | * | 7/2010 | Aruga et al. | 327/539 |

FOREIGN PATENT DOCUMENTS

| | | |
|---|---|---|
| JP | 07-336875 A | 12/1995 |
| JP | 09-79916 A | 3/1997 |
| JP | H10-009967 A | 1/1998 |
| JP | 11-121694 A | 4/1999 |

* cited by examiner

*Primary Examiner* — Lisa Caputo
*Assistant Examiner* — Nasir U Ahmed
(74) *Attorney, Agent, or Firm* — Rabin & Berdo, P.C.

(57) ABSTRACT

A temperature detection circuit that can detect temperature with high accuracy regardless of manufacturing variations, and a method of adjusting the same. The circuit includes: first and second diodes having respective independent p-n junctions; a first current path including a first variable voltage dividing resistor series connected to the first diode; a second current path including a second variable voltage dividing resistor series connected to the second diode; a reference voltage generation part that feeds back a differential voltage to each of the first and second current paths and outputs as a reference voltage the differential voltage indicating a difference between a first divided voltage of the first variable voltage dividing resistor and a potential on the second current path; and a temperature detection signal generation part generating a temperature detection signal based on a second divided voltage of the second variable voltage dividing resistor.

7 Claims, 11 Drawing Sheets

TEMPERATURE DETECTION CIRCUIT AND METHOD OF ADJUSTING THE SAME

BACKGROUND OF THE INVENTION

1. Field of the Invention

The present invention relates to a temperature detection circuit, and more particularly to a temperature detection circuit for detecting a temperature of a semiconductor integrated device and a method of adjusting the same.

2. Background Art

Electronic devices including semiconductor integrated devices are configured to activate a protection circuit when the device temperature inside exceeds a predetermined temperature in order to prevent a malfunction or damage occurring from heat generation during operation. For example, a thermistor may be used to detect the temperature inside a device. Thermistors typically have large manufacturing variations. For accurate temperature detection, expensive thermistors with less manufacturing variations have needed to be used.

To detect the temperature inside an electronic device without using a temperature sensor such as a thermistor, a technique for generating a temperature-independent reference voltage by a bandgap reference circuit has been proposed (for example, see FIG. 1 of Patent Literature 1). The bandgap reference circuit generates a negative feedback voltage for equalizing the base-emitter voltages of first transistors (65 to 67) and second transistors (68 to 70) having different emitter areas by an operational amplifier (61), and outputs the voltage as a reference voltage (Vbgr). The base-emitter voltages decrease with the increasing semiconductor temperature. Since the first transistors and the second transistors have different emitter areas as described above, the degree of decrease of the base-emitter voltages of the first transistors due to a temperature increase is different from that of the base-emitter voltages of the second transistors due to the temperature increase. At absolute zero, the base-emitter voltages converge to the band gab voltage resulting from the semiconductor band gap energy irrespective of the emitter areas. In other words, the difference between the base-emitter voltages of the respective first and second transistors corresponds to the amount of voltage change due to the temperature change. The foregoing operational amplifier then operates to cancel the amounts of decrease of the base-emitter voltages due to the temperature change, whereby a reference voltage having the band gap voltage independent of temperature changes is generated.

However, the resistors (R1 to R5), the transistors (65 to 70), and the operational amplifier (61) used in the bandgap reference circuit are also subject to characteristic changes because of manufacturing variations. There has thus been the problem that accurate temperature detection is difficult.

CITATION LIST

Patent Literature

PTL 1: Japanese Patent Application Kokai No. H10-9967

SUMMARY OF THE INVENTION

The present invention has been achieved in order to solve the foregoing problem. It is thus an object of the present invention to provide a temperature detection circuit that can detect temperature with high accuracy regardless of manufacturing variations, and a method of adjusting the same.

A temperature detection circuit according to one aspect of the present invention is a temperature detection circuit for generating a temperature detection signal indicating a temperature of a semiconductor, the temperature detection circuit including: first and second diodes having respective p-n junctions independent from each other; a first current path including a first variable voltage dividing resistor that is connected in series to the first diode and whose dividing resistance ratio is variable according to a first offset adjustment signal; a second current path including a second variable voltage dividing resistor that is connected in series to the second diode and whose dividing resistance ratio is variable according to a second offset adjustment signal; a reference voltage generation part that feeds back a differential voltage to each of the first and second current paths and outputs the differential voltage as a reference voltage, the differential voltage indicating a difference between a first divided voltage divided by the first variable voltage dividing resistor and a potential on the second current path; and a temperature detection signal generation part that generates the temperature detection signal on the basis of a second divided voltage divided by the second variable voltage dividing resistor.

A method of adjusting a temperature detection circuit according to another aspect of the present invention is a method of adjusting the temperature detection circuit according to the one aspect of the present invention, the method including: a first step of changing a level of the first offset adjustment signal to make the reference voltage coincide with a predetermined first voltage; a second step of changing a level of the second offset adjustment signal to make the second divided voltage coincide with a predetermined second voltage; and a third step of changing a level of the third offset adjustment signal to make a level of the temperature detection signal coincide with a predetermined third voltage.

The temperature detection circuit according to the one aspect of the present invention generates a temperature-independent reference voltage on the basis of the forward voltages of the first and second diodes having respective p-n junctions independent from each other. The reference voltage is generated from the forward voltage of the first diode, adjusted by the first variable voltage dividing resistor. The adjustment of the first variable voltage resistor to make the generated reference voltage equal to the band gap voltage enables high-accuracy temperature detection while suppressing a reduction in accuracy due to manufacturing variations.

The temperature detection circuit also generates the temperature detection signal indicating the temperature of the semiconductor on the basis of the forward voltage of the second diode, whose voltage decreases with an increase in the temperature of the semiconductor. The temperature detection signal is generated from the forward voltage of the second diode, adjusted by the second variable voltage dividing resistor. The adjustment by the second variable voltage dividing resistor can change the temperature gradient of the temperature detection signal (the degree of voltage change due to a change in temperature), whereby the sensitivity of the temperature detection can be set arbitrarily.

The temperature detection circuit obtains the temperature detection signal by amplifying the forward voltage of the second diode by an amplification part with an adjustable gain. Adjusting the amplification gain of the amplification part so that the temperature detection signal has a predetermined voltage under a predetermined temperature condition enables high-accuracy temperature detection while suppressing a drop in accuracy due to manufacturing variations.

Moreover, according to the temperature detection circuit of the one aspect of the present invention, the foregoing various adjustments can be made under the same temperature condition. The adjustment time can thus be reduced.

DETAILED DESCRIPTION OF THE INVENTION

The temperature detection circuit according to the one aspect of the present invention includes: first and second diodes (11 and 12) having respective independent p-n junctions; a first current path including a first variable voltage dividing resistor (13) that is connected in series to the first diode and whose dividing resistance ratio is variable according to a first offset adjustment signal (VREF$_{OFS}$); a second current path including a second variable voltage dividing resistor (25) that is connected in series to the second diode and whose dividing resistance ratio is variable according to a second offset adjustment signal (DIOD$_{OFS}$); a reference voltage generation part (20) that feeds back a differential voltage to each of the first and second current paths and outputs the differential voltage as a reference voltage (VREF), the differential voltage indicating a difference between a first divided voltage (V1) divided by the first variable voltage dividing resistor and a potential on the second current path; and a temperature detection signal generation part that generates a temperature detection signal (SENS) based on a second divided voltage (V2) divided by the second variable voltage dividing resistor.

The method of adjusting the temperature detection circuit includes: a first step (S23 and S24) of changing a level of the first offset adjustment signal to make the reference voltage coincide with a predetermined first voltage; a second step (S27 and S28) of changing a level of the second offset adjustment signal to make the second divided voltage coincide with a predetermined second voltage; and a third step (S31 and S32) of changing a level of a third offset adjustment signal to make a level of the temperature detection signal coincide with a predetermined third voltage.

Embodiment 1

Hereinafter, a temperature detection circuit according to the present invention will be described in detail with reference to the drawings.

Figure 1:
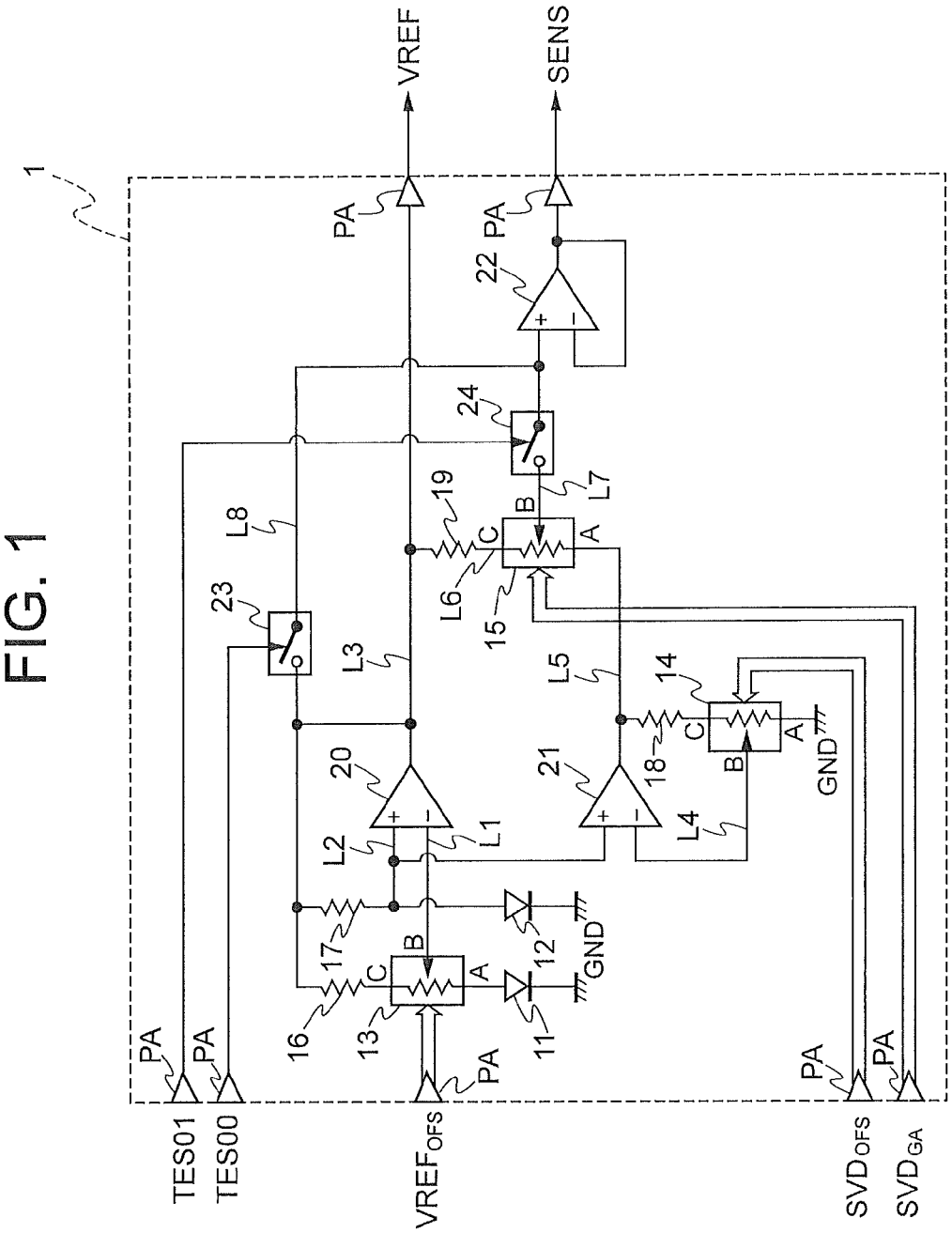
FIG. 1 is a circuit diagram showing a temperature detection circuit 1 according to the present invention.

FIG. 1 is a circuit diagram showing a first embodiment of the temperature detection circuit according to the present invention.

In FIG. 1, the temperature detection circuit 1 is a so-called bandgap reference circuit which uses the band gap energy of silicon semiconductors. The temperature detection circuit 1 is constructed on a semiconductor integrated chip to detect temperature of. The temperature detection circuit 1 includes diodes 11 and 12, variable voltage dividing resistors 13 to 15, resistors 16 to 19, operational amplifiers 20 to 22, and switch elements 23 and 24.

A ground potential GND is applied to the cathode terminal of the diode 11 serving as a first diode 11. The anode terminal of the diode 11 is connected to a terminal A of the variable voltage dividing resistor 13. The terminal A of the variable voltage dividing resistor 13 is connected to the anode terminal of the diode 11. A terminal B of the variable voltage dividing resistor 13 is connected to the inverting input terminal of the operational amplifier 20 through a line L1. A terminal C of the variable voltage dividing resistor 13 is connected to one of the terminals of the resistor 16. The variable voltage dividing resistor 13 changes a dividing resistance ratio between the resistance across its terminals A and B and the resistance across its terminals B and C on the basis of a reference offset value. The reference offset value is indicated by a reference voltage offset adjustment signal VREF$_{OFS}$ which is supplied through an external terminal PA of the semiconductor integrated chip.

The ground potential GND is applied to the cathode terminal of the diode 12 serving as a second diode. The anode terminal of the diode 12 is connected to one of the terminals of the resistor 17 and to the non-inverting input terminals of the operational amplifiers 20 and 21 through a line L2. The diodes 11 and 12 constructed on the semiconductor integrated chip have respective independent p-n junctions. The diode 12 has a p-n junction area 1/N the p-n junction area of the diode 11 (N is a real number greater than 1). In other words, the diode 12 has a p-n junction area smaller than that of the diode 11.

The operational amplifier 20 generates a differential voltage corresponding to a difference between the voltage on the line L1 and the voltage on the line L2. The operational amplifier 20 supplies the differential voltage to the resistors 16, 17, and 19, and the switch element 23 through a line L3, and outputs the differential voltage through an external terminal PA of the semiconductor integrated chip as a reference voltage VREF. The reference voltage VREF is a fixed voltage based on the semiconductor band gap energy. For example, the reference voltage VREF is 1.25±α volts.

The inverting input terminal of the operational amplifier 21 is connected to a terminal B of the variable voltage dividing resistor 14 through a line L4. The output terminal of the operational amplifier 21 is connected to a line L5 and one of the terminals of the resistor 18. The ground potential GND is applied to a terminal A of the variable voltage dividing resistor 14. A terminal C of the variable voltage dividing resistor 14 is connected to the other terminal of the resistor 18. The variable voltage dividing resistor 14 changes a dividing resistance ratio between the resistance across the terminals A and B and the resistance across the terminals B and C on the basis of a sensor offset value. The sensor offset value is indicated by a temperature detection offset adjustment signal, or third offset adjustment signal, SVD$_{OFS}$ which is supplied through an external terminal PA of the semiconductor integrated chip. The operational amplifier 21 thus amplifies the voltage of the anode terminal of the diode 12 with a gain according to the set state of the resistances of the variable voltage dividing resistor 14. The operational amplifier 21 supplies the resulting amplified voltage to the one terminal of the resistor 18 and a terminal A of the variable voltage resistor 15 through the line L5. In other words, the operational amplifier 21 amplifies the voltage on the anode terminal of the diode 12 with a gain based on the sensor offset value which is indicated by the temperature detection offset adjustment signal $SVD_{OFS}$. The operational amplifiers 20 and 21 are made of the same materials and by the same manufacturing process.

As described above, the output voltage of the operational amplifier 21 is applied to the terminal A of the variable voltage dividing resistor 15 through the line L5. A terminal C of the variable voltage dividing resistor 15 is connected with the resistor 19 through a line L6. A terminal B of the variable voltage dividing resistor 15 is connected with one of the terminals of the switch element 24 through a line L7. The other terminal of the switch element 24 is connected to the non-inverting input terminal of the operational amplifier 22 and the switch element 23 through a line L8. The variable voltage dividing resistor 15 changes a dividing resistance ratio between the resistance across the terminals A and B and the resistance across the terminals B and C on the basis of a temperature gradient adjustment value. The temperature gradient adjustment value is indicated by a temperature gradient adjustment signal $SVD_{GA}$ which is supplied through an external terminal PA of the semiconductor integrated chip.

The switch element 23 is set to an ON state or an OFF state according to an adjustment point select signal TES00 which is supplied through an external terminal PA of the semiconductor integrated chip. The switch element 23 supplies the voltage on the line L3 to the non-inverting input terminal of the operational amplifier 22 through the line L8 only while the switch element 23 is set to the ON state. The switch element 23 is fixed to the OFF state when the temperature detection circuit 1 is in a normal operation.

The switch element 24 is set to an ON state or an OFF state according to an adjustment point select signal TES01 which is supplied through an external terminal PA of the semiconductor integrated chip. The switch element 24 supplies the voltage on the terminal B of the variable voltage dividing resistor 15 to the non-inverting input terminal of the operational amplifier 22 through the line L8 only while the switch element 24 is set to the ON state. The switch element 24 is fixed to the ON state when the temperature detection circuit 1 is in a normal operation.

The operational amplifier 22 is a so-called voltage follower circuit, having the inverting input terminal and the output terminal connected to each other. The operational amplifier 22 outputs the voltage on the line L8 through an external terminal PA of the semiconductor integrated chip as a temperature detection signal SENS.

The operation of the foregoing temperature detection circuit 1 will be described below.

Figure 2:
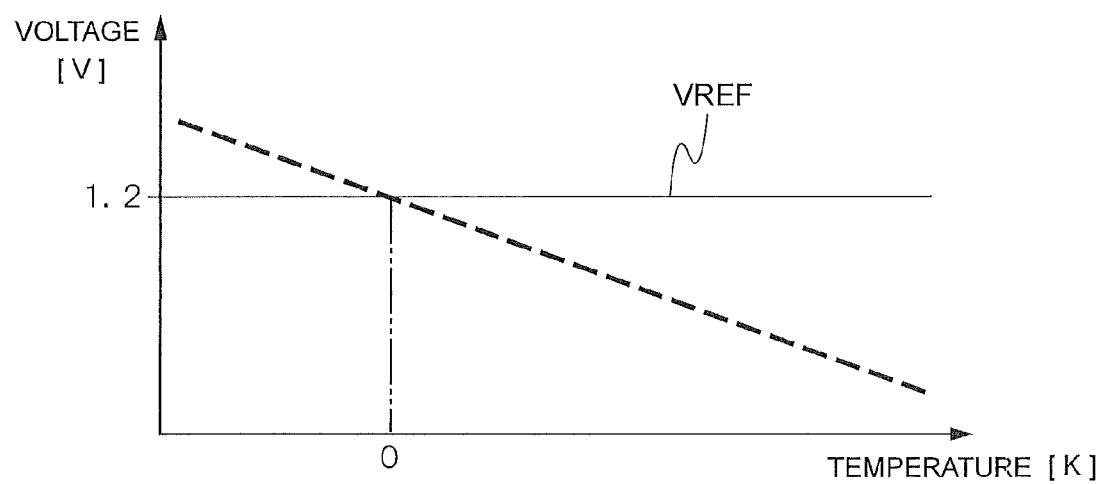
FIG. 2 is a chart showing an example of a reference voltage VREF and a temperature gradient characteristic.

For example, as shown by the dashed line in FIG. 2, the voltages of the anode terminals of both the diodes 11 and 12 shown in FIG. 1 are 1.2 V when the temperature of the semiconductor integrated chip itself is absolute zero, i.e., 0 K (kelvin). The voltages decrease with the increasing temperature. The temperature of the semiconductor integrated chip can thus be detected on the basis of the voltages on the anode terminals of the diodes. The operational amplifier 21, the variable voltage dividing resistor 15, the switch element 24, and the operational amplifier 22 then constitute a temperature detection signal generation part. Such a temperature detection signal generate part generates the temperature detection signal SENS for indicating the temperature of the semiconductor integrated chip on the basis of the voltage on the anode terminal of the diode 12, and outputs the temperature detection signal SENS to outside.

Meanwhile, the operational amplifier 20 serving as a reference voltage generation part sends out the reference voltage VREF. The reference voltage VREF is a differential voltage between the voltage on the terminal B of the variable voltage dividing resistor 13, to which the anode terminal of the diode 11 is connected, and the voltage on the anode terminal of the diode 12. The differential voltage is fed back to the inverting input terminal of the operational amplifier 20 through the resistor 16 and the variable voltage dividing resistor 13 and to the non-inverting input terminal of the operational amplifier 20 through the resistor 17. With such a configuration, the operational amplifier 20 operates to generate a feedback voltage as the reference voltage VREF such that the forward voltage (the voltage of the anode terminal) of the diode 12 and the voltage on the terminal B of the variable voltage dividing resistor 13 based on the forward voltage (the voltage of the anode terminal) of the diode 11 coincide with each other. Since the diodes 11 and 12 have respective different p-n junction areas, different amounts of current flow into the respective diodes 11 and 12. The degree of decrease of the forward voltage of the diode 12 due to a temperature increase is thus different from that of the forward voltage of the diode 11 due to the temperature increase. At absolute zero, both the diodes 11 and 12 have a forward voltage of 1.2 V. The difference between the forward voltage of the diode 12 and that of the diode 11 represents the amount of voltage change because of a change in temperature. The amount of voltage change can thus be used to cancel the decreases of the forward voltages due to the temperature increase, whereby a constant reference voltage VREF independent of temperature changes can be generated. For such reasons, the operational amplifier 20 generates, as the reference voltage VREF, a voltage value that makes the forward voltage (the voltage of the anode terminal) of the diode 12 equal to the divided voltage obtained by dividing the forward voltage (the voltage of the anode terminal) of the diode 11 by the variable voltage dividing resistor 13. Note that the reference voltage VREF has the value of 1.2 V which is the semiconductor band gap voltage at absolute zero (hereinafter, referred to as BGR voltage). As shown in FIG. 2, the reference voltage VREF is constantly 1.2 V independent of temperature changes of the semiconductor integrated chip.

The reference voltage VREF and the temperature detection signal SENS generated by the temperature detection circuit 1 can be used to detect an abnormal temperature caused by the semiconductor integrated chip. For example, a threshold voltage that indicates the upper limit temperature allowable as the temperature caused by the semiconductor integrated chip may be generated on the basis of the reference voltage VREF (1.2 V). If the temperature detection signal SENS is higher than the threshold voltage, the temperature of the semiconductor integrated chip is determined to be in a normal temperature range. If lower, the semiconductor integrated chip is determined to be in a state of abnormally high temperature.

An adjustment operation to be performed on a semiconductor integrated chip including the foregoing temperature detection circuit 1 at the time of factory shipment will be described below.

Figure 3:
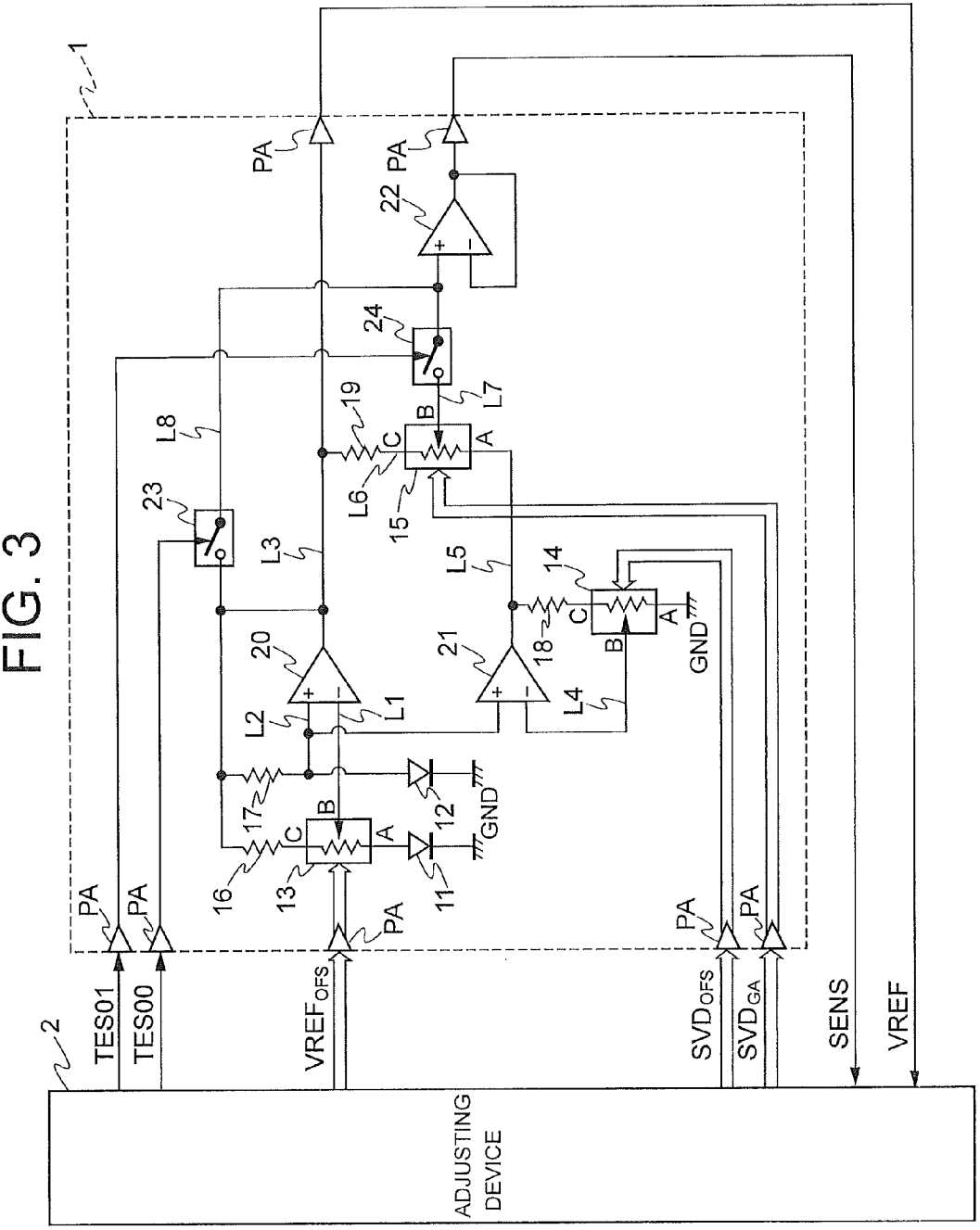
FIG. 3 is a diagram showing a system configuration for adjusting the temperature detection circuit 1.

FIG. 3 is a block diagram showing a system configuration for adjusting the temperature detection circuit 1.

In the system configuration shown in FIG. 3, an adjusting device 2 is connected to the external terminals PA of the semiconductor integrated chip including the temperature detection circuit 1.

Figure 4:
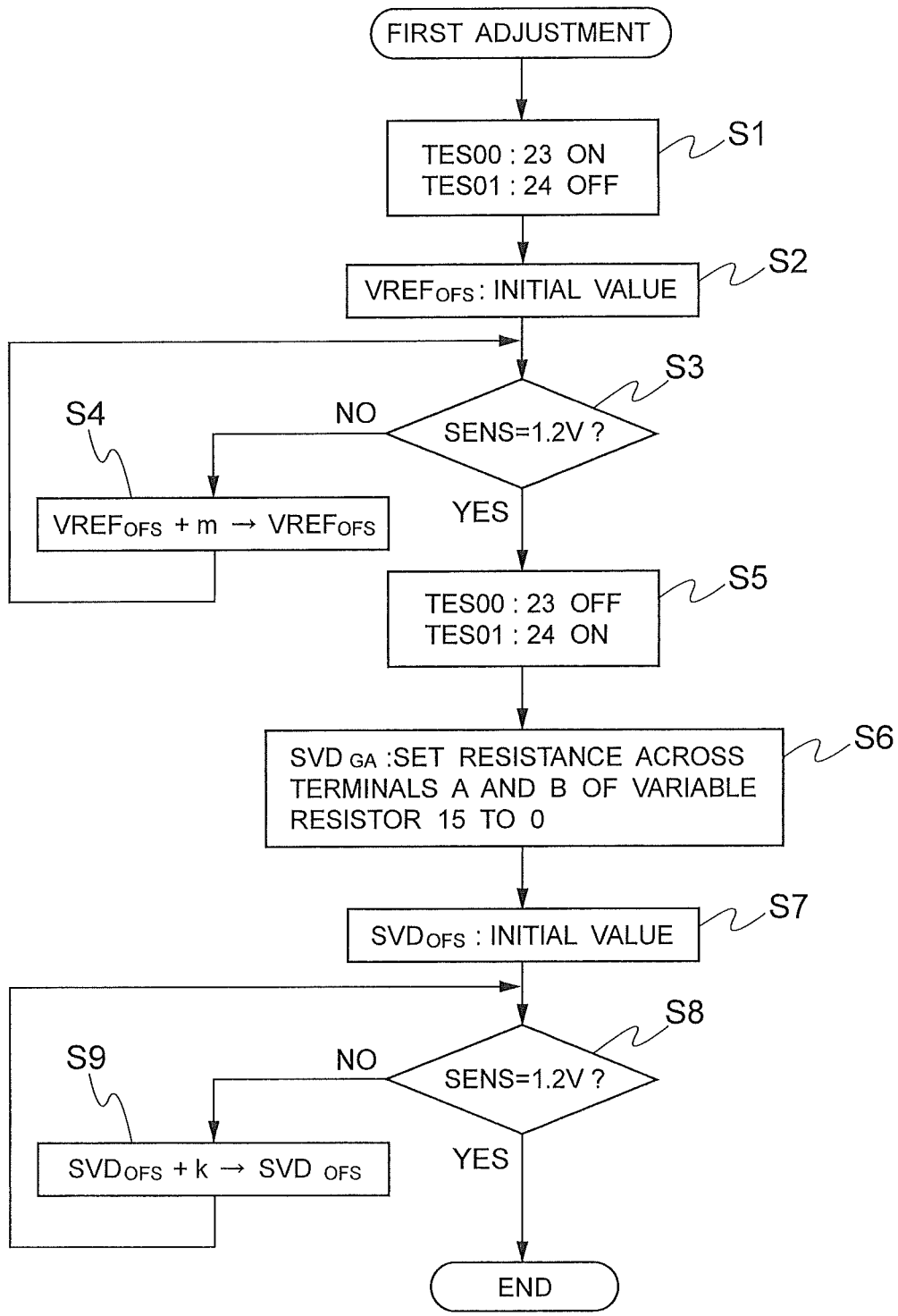
FIG. 4 is a flowchart showing a first adjustment procedure to be performed by an adjusting device 2.

The adjusting device 2 initially adjusts the temperature detection circuit 1 by a procedure according to a first adjustment flow such as shown in FIG. 4, with the temperature of the semiconductor integrated chip itself maintained at a predetermined first temperature.

In FIG. 4, the adjusting device 2 initially supplies the temperature detection circuit 1 with the adjustment point select signal TES00 for setting the switch element 23 to the ON state and the adjustment point select signal TES01 for setting the switch element 24 to the OFF state (step S1). By the execution of step S1, the voltage sent from the operational amplifier 20 of the temperature detection circuit 1 is supplied to the non-inverting input terminal of the operational amplifier 22 through the switch element 23.

Next, the adjusting device 2 supplies the temperature detection circuit 1 with the reference voltage offset adjustment signal $VREF_{OFS}$ that indicates an initial value as the reference offset value (step S2). According to the reference voltage offset adjustment signal $VREF_{OFS}$ indicating the initial value, the variable voltage dividing resistor 13 of the temperature detection circuit 1 sets the resistance across the terminals A and B or the resistance across the terminals B and C to zero, for example. By the execution of steps S1 and S2, the voltage sent from the operational amplifier 20 is supplied to the adjusting device 2 through the switch element 23 and the operational amplifier 22 as the temperature detection signal SENS.

Next, the adjusting device 2 determines whether the temperature detection signal SENS supplied from the temperature detection circuit 1 is equal to 1.2 V, the BGR voltage (step S3). In step S3, if the temperature detection signal SENS is determined not to be 1.2 V, the adjusting device 2 adds a predetermined fixed value m to the reference offset value indicated by the reference voltage offset adjustment signal $VREF_{OFS}$, and supplies the resultant to the temperature detection circuit 1 as a new reference voltage offset adjustment signal $VREF_{OFS}$ (step S4). By the execution of step S4, the variable voltage dividing resistor 13 of the temperature detection circuit 1 changes the dividing resistance ratio between the resistance across the terminals A and B and the resistance across the terminals B and C by an amount corresponding to the fixed value m.

After the execution of step S4, the adjusting device 2 returns to the execution of step S3 to repeat the foregoing operation. The repetitions of steps S3 and S4 gradually change the ratio between the resistance across the terminals A and B and the resistance across the terminals B and C of the variable voltage dividing resistor 13. As a result, the voltage value of the temperature detection signal SENS sent through the operational amplifier 20, the switch element 23, and the operational amplifier 22 gradually increases or decreases.

Now, if in step S3 the temperature detection signal SENS is determined to be equal to 1.2 V, the adjusting device 2 supplies the temperature detection circuit 1 with the adjustment point select signal TES00 for setting the switch element 23 to the OFF state and the adjustment point select signal TES01 for setting the switch element 24 to the ON state (step S5). By the execution of step S5, the voltage on the terminal B of the variable voltage dividing resistor 15 is supplied to the non-inverting input terminal of the operational amplifier 22 through the switch element 24.

Next, the adjusting device 2 supplies the temperature detection circuit 1 with the temperature gradient adjustment signal $SVD_{GA}$ that indicates a value for setting the resistance across the terminals A and B of the variable voltage dividing resistor 15 to zero (step S6). By the execution of step S6, the voltage sent from the operational amplifier 21 is simply supplied to the non-inverting input terminal of the operational amplifier 22 through the switch element 24.

Next, the adjusting device 2 supplies the temperature detection circuit 1 with the temperature detection offset adjustment signal $SVD_{OFS}$ that indicates an initial value as the sensor offset value (step S7). According to the temperature detection offset adjustment signal $SVD_{OFS}$ indicating the initial value, the variable voltage dividing resistor 14 of the temperature detection circuit 1 sets the resistance across the terminals A and B or the resistance across the terminals B and C to zero, for example. By the execution of steps S5 to S7, the voltage on the anode terminal of the diode 12 is amplified by the operational amplifier 21 and supplied to the adjusting device 2 through the switch element 23 and the operational amplifier 22 as the temperature detection signal SENS. Here, the operational amplifier 21 amplifies the voltage on the anode terminal of the diode 12 with a gain based on the resistance of the variable voltage dividing resistor 14 set by the temperature detection offset adjustment signal $SVD_{OFS}$ and the resistor 18.

Next, the adjusting device 2 determines whether the temperature detection signal SENS supplied from the temperature detection circuit 1 is equal to 1.2 V, the BGR voltage (step S8). In step S8, if the temperature detection signal SENS is determined not to be 1.2 V, the adjusting device 2 adds a predetermined fixed value k to the value indicated by the temperature detection offset adjustment signal $SVD_{OFS}$ and supplies the resultant to the temperature detection circuit 1 as a new temperature detection offset adjustment signal $SVD_{OFS}$ (step S9). By the execution of step S9, the variable voltage dividing resistor 14 of the temperature detection circuit 1 changes the dividing resistance ratio between the resistance across the terminals A and B and the resistance across the terminals B and C by an amount corresponding to the fixed value k. This increases or decreases the gain of the operational amplifier 21, and the value of the temperature detection signal SENS increases or decreases accordingly.

After the execution of step S9, the adjusting device 2 returns to the execution of step S8 to repeat the foregoing operation. The repetitions of steps S8 and S9 gradually increase or decrease the gain of the operational amplifier 21, and the value of the temperature detection signal SENS gradually increases or decreases accordingly.

Now, if in step S8 the temperature detection signal SENS is determined to be equal to 1.2 V, the adjusting device 2 ends the first adjustment shown in FIG. 4. The adjusting device 2 subsequently adjusts the temperature detection circuit 1 by a procedure according to a second adjustment flow such shown in FIG. 5, with the temperature of the semiconductor integrated chip itself changed to a second temperature different from the first temperature.

Figure 5:
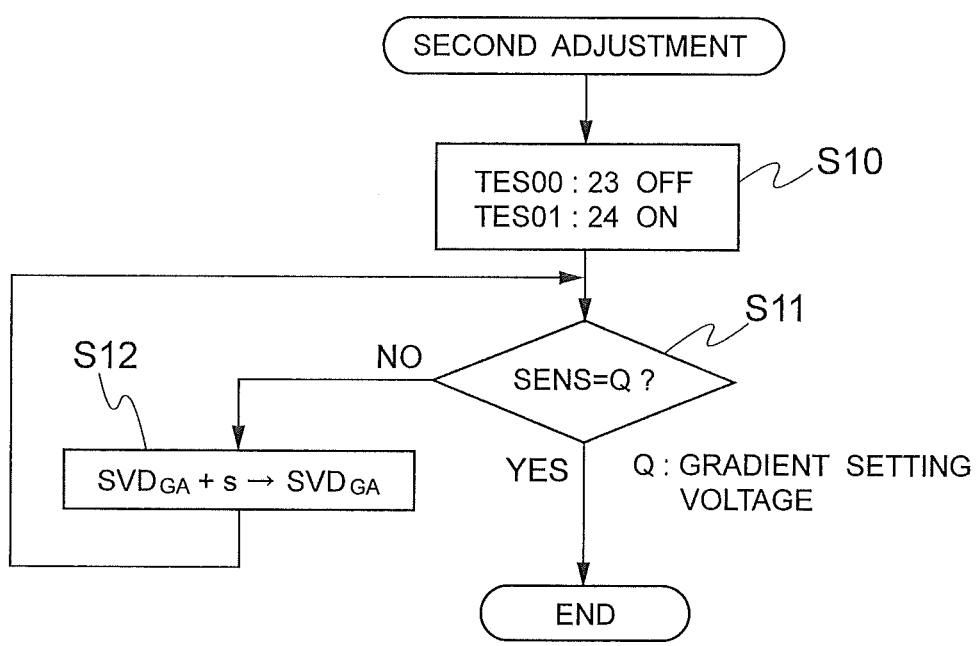
FIG. 5 is a flowchart showing a second adjustment procedure to be performed by the adjusting device 2.

In FIG. 5, the adjusting device 2 initially supplies the temperature detection circuit 1 with the adjustment point select signal TES00 for setting the switch element 23 to the OFF state and the adjustment point select signal TES01 for setting the switch element 24 to the ON state (step S10). By the execution of step S10, the voltage on the terminal B of the variable voltage dividing resistor 15 is supplied to the non-inverting input terminal of the operational amplifier 22 through the switch element 24. As a result, the voltage of the anode terminal of the diode 12 is supplied to the adjusting device 2 through the operational amplifier 21, the variable voltage dividing resistor 15, the switch element 24, and the operational amplifier 22 as the temperature detection signal SENS.

Next, the adjusting device 2 determines whether the voltage value indicated by the temperature detection signal SENS is equal to a gradient setting voltage Q along a desired temperature gradient characteristic (step S11). In step S11, if the voltage indicated by the temperature detection signal SENS is determined not to coincide with the gradient setting voltage Q, the adjusting device 2 adds a predetermined fixed value s to the value indicated by the temperature gradient adjustment signal $SVD_{GA}$, and supplies the resultant to the temperature detection circuit 1 as a new temperature gradient adjustment signal $SVD_{GA}$ (step S12). By the execution of step S12, the variable voltage dividing resistor 15 of the temperature detection circuit 1 changes the dividing resistance ratio between the resistance across the terminals A and B and the resistance across the terminal B and C by an amount corresponding to the fixed value s. As a result, the temperature detection signal SENS increases or decreases in value. After the execution of step S12, the adjusting device 2 returns to the execution of step S11 to repeat the foregoing operation. The repetitions of steps S11 and S12 gradually change the resistance ratio between the resistance across the terminals A and B and the resistance across the terminals B and C of the variable voltage dividing resistor 15, and the value of the temperature detection signal SENS gradually increases or decreases accordingly.

Now, if in step S11 the temperature detection signal SENS is determined to be equal to the gradient setting voltage Q along the desired temperature gradient characteristic, the adjusting device 2 ends the second adjustment shown in FIG. 5. The second adjustment shown in FIG. 5 sets the gradient of the voltage transition of the temperature detection signal SENS to follow the transition of the temperature caused by the semiconductor integrated chip. The steeper the gradient of the voltage transition of the temperature detection signal SENS with respect to temperature is, the higher the detection sensitivity to the temperature change of the semiconductor integrated chip is.

As described above, the temperature detection circuit 1 shown in FIG. 1 includes the variable voltage dividing resistor 13. The variable voltage dividing resistor 13 adjusts the forward voltage of the diode 11 according to the reference voltage offset adjustment signal $VREF_{OFS}$ and supplies the resultant to the operational amplifier 20 so that the value of the reference voltage VREF generated by the operational amplifier 20 coincides with the predetermined BGR voltage (1.2 V). Consequently, even if the characteristics of the respective modules vary due to manufacturing variations, the fixed reference voltage VREF of 1.2 V can be generated with high accuracy.

In the temperature detection circuit 1 shown in FIG. 1, the operational amplifier 21 amplifies the forward voltage of the diode 12 serving as the generation source of the BGR voltage, whereby the temperature detection signal SENS having a voltage corresponding to the temperature of the semiconductor integrated chip is generated. The temperature detection circuit 1 includes the variable voltage dividing resistor 14. The variable voltage dividing resistor 14 changes the gain of the operational amplifier 21 according to the temperature detection offset adjustment signal $SVD_{OFS}$, thereby adjusting the level of the temperature detection signal SENS. Consequently, even if the characteristics of the modules vary due to manufacturing variations, the variable voltage dividing resistor 14 can be adjusted to generate a highly accurate temperature detection signal SENS that follows the temperature of the semiconductor integrated chip.

The temperature detection circuit 1 shown in FIG. 1 further includes the variable voltage dividing resistor 15. The variable voltage dividing resistor 15 adjusts the amplified voltage sent from the operational amplifier 21 according to the temperature gradient adjustment signal $SVD_{GA}$, whereby the temperature gradient, i.e., the degree of voltage change of the temperature detection signal SENS to follow a temperature increase (decrease) is adjusted arbitrarily. This allows an arbitrary setting of the detection sensitivity to a temperature change of the semiconductor integrated chip.

While the temperature detection circuit 1 shown in FIG. 1 uses the p-n junction diodes 11 and 12 as the elements to be the source of the BGR voltage, p-n junction transistors may be used instead. It is only essential that p-n junction semiconductor elements subject to band gap energy be used as the elements to be the source of the BGR voltage.

Embodiment 2

Figure 6:
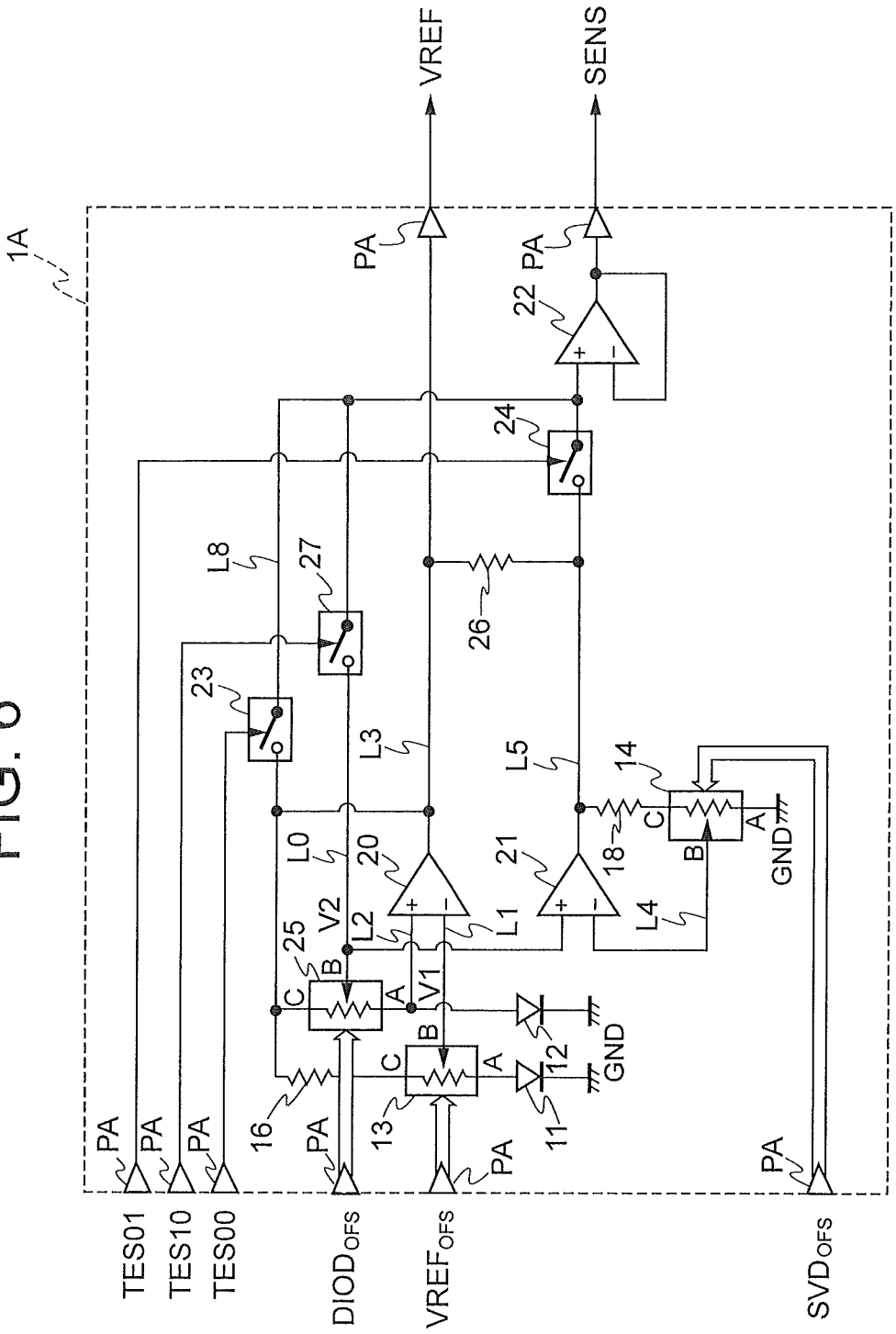
FIG. 6 is a circuit diagram showing a temperature detection circuit 1A according to the present invention.

FIG. 6 is a circuit diagram showing a second embodiment of the temperature detection circuit according to the present invention.

In FIG. 6, the temperature detection circuit 1A is a so-called bandgap reference circuit which uses semiconductor band gap energy, and is constructed on a semiconductor integrated chip to detect temperature of. The temperature detection circuit 1A includes diodes 11 and 12, variable voltage dividing resistors 13, 14, and 25, resistors 16, 18, and 26, operational amplifiers 20 to 22, and switch elements 23, 24, and 27.

A ground potential GND is applied to the cathode terminal of the diode 11 serving as a first diode. The anode terminal of the diode 11 is connected to a terminal A of the variable voltage dividing resistor 13.

The terminal A of the variable voltage dividing resistor 13 serving as a first variable voltage dividing resistor is connected to the anode terminal of the diode 11. A terminal B of the variable voltage dividing resistor 13 is connected to the inverting input terminal of the operational amplifier 20 through a line L1. A terminal C of the variable voltage dividing resistor 13 is connected to one of the terminals of the resistor 16. The variable voltage dividing resistor 13 changes a dividing resistance ratio between the resistance across the terminals A and B and the resistance across the terminals B and C on the basis of a reference offset value. The reference offset value is indicated by a reference voltage offset adjustment signal $VREF_{OFS}$ serving as a first offset adjustment signal which is supplied through an external terminal PA of the semiconductor integrated chip. In other words, the variable voltage dividing resistor 13 divides the forward voltage (the voltage of the anode terminal) of the diode 11 by the dividing resistance ratio according to the reference voltage offset adjustment signal $VREF_{OFS}$, and supplies the resulting first divided voltage V1 to the operational amplifier 20 through the terminal B.

The ground potential GND is applied to the cathode terminal of the diode 12 serving as a second diode. The anode terminal of the diode 12 is connected to a terminal A of the variable voltage dividing resistor 25 and the non-inverting input terminal of the operational amplifier 20 through a line L2. The diodes 11 and 12 formed on the semiconductor integrated chip have respective independent p-n junctions. The diode 12 has a p-n junction area 1/N the p-n junction area of the diode 11 (N is a real number greater than 1). In other words, the diode 12 has a p-n junction area smaller than that of the diode 11.

The operational amplifier 20 serving as a reference voltage generation part generates a differential voltage corresponding to a difference between the first divided voltage V1 on the line L1 and the forward voltage of the diode 12 on the line L2. The operational amplifier 20 supplies the differential voltage to the resistors 16 and 26, a terminal C of the variable voltage dividing resistor 25, and the switch element 23 through a line L3, and outputs the differential voltage through an external terminal PA of the semiconductor integrated chip as a reference voltage VREF. The reference voltage VREF is a fixed voltage based on the semiconductor band gap energy. For example, the reference voltage VREF is 1.25±α V.

The terminal A of the variable voltage dividing resistor 25 serving as a second variable voltage dividing resistor is connected with the anode terminal of the diode 12 and the non-inverting input terminal of the operational amplifier 20 through the line L2. A terminal B of the variable voltage dividing resistor 25 is connected to the non-inverting input terminal of the operational amplifier 21 and the switch element 27 through a line L0. The variable voltage dividing resistor 25 changes a resistance ratio between the resistance across the terminals A and B and the resistance across the terminals B and C based on a diode offset value. The diode offset value is indicated by a diode offset adjustment signal $DIOD_{OFS}$ as a second offset adjustment signal which is supplied through an external terminal PA of the semiconductor integrated chip. In other words, the variable voltage dividing resistor 25 divides the forward voltage (the voltage of the anode terminal) of the diode 12 by the dividing resistance ratio according to the diode offset adjustment signal $DIOD_{OFS}$, and supplies the resulting second divided voltage V2 to the operational amplifier 21 through the terminal B.

The inverting input terminal of the operational amplifier 21 is connected to a terminal B of the variable voltage dividing resistor 14 through a line L4. The output terminal of the operational amplifier 21 is connected to the resistors 18 and 26 and the switch element 24 through a line L5. The ground potential GND is applied to a terminal A of the variable voltage dividing resistor 14. A terminal C of the variable division resistor 14 is connected to the other terminal of the resistor 18.

The variable voltage dividing resistor 14 serving as a third variable voltage dividing resistor changes a resistance ratio between the resistance across the terminals A and B and the resistance across the terminals B and C on the basis of a sensor offset value. The sensor offset value is indicated by a temperature detection offset adjustment signal $SVD_{OFS}$ which is supplied through an external terminal PA of the semiconductor integrated chip. In other words, the variable voltage dividing resistor 14 adjusts the amplification gain of the operational amplifier 21 according to the temperature detection offset adjustment signal $SVD_{OFS}$. As a result, the operational amplifier 21 amplifies the voltage on the anode terminal of the diode 12, supplied through the variable voltage dividing resistor 25, by the gain according to the resistances of the variable voltage dividing resistor 14 and the resistor 18, and supplies the resulting amplified voltage to one of the terminals of the resistor 26 and one of the terminals of the switch element 24 through a line L5. In short, the operational amplifier 21 amplifies the voltage on the anode terminal of the diode 12, supplied through the variable voltage dividing resistor 25, by the gain based on the sensor offset value indicated by the temperature detection offset adjustment signal $SVD_{OFS}$. The operational amplifiers 20 and 21 are made of the same materials and by the same manufacturing process. The other end of the switch element 24 is connected to the non-inverting input terminal of the operational amplifier 22 and the switch elements 23 and 27 through a line L8.

The switch element 23 is set to an ON state or an OFF state according to an adjustment point select signal TES00 which is supplied through an external terminal PA of the semiconductor integrated chip. The switch element 23 supplies the voltage on the line L3 to the non-inverting input terminal of the operational amplifier 22 through the line L8 only while the switch element 23 is set to the ON state. The switch element 23 is fixed to the OFF state when the temperature detection circuit 1A is in a normal operation. The switch element 24 is set to an ON state or an OFF state according to an adjustment point select signal TES01 which is supplied through an external terminal PA of the semiconductor integrated chip. The switch element 24 supplies the amplified voltage sent from the operational amplifier 21 to the non-inverting input terminal of the operational amplifier 22 only while the switch element 24 is set to the ON state. The switch element 24 is fixed to the ON state when the temperature detection circuit 1A is in a normal operation. The switch element 27 is set to an ON state or an OFF state according to an adjustment point select signal TES10 which is supplied through an external terminal PA of the semiconductor integrated chip. The switch element 27 supplies the second divided voltage V2 on the terminal B of the foregoing variable voltage dividing resistor 25 to the non-inverting input terminal of the operational amplifier 22 through the line L8 only while the switch element 27 is set to the ON state. The switch element 27 is fixed to the OFF state when the temperature detection circuit 1A is in a normal operation.

In short, the switch elements 23, 24, and 27 constitute a switch part which selects any one of the differential voltage on the line L3 (the output of the operational amplifier 20), the voltage on the line L5 (the output of the operational amplifier 21), and the second divided voltage V2 on the terminal B of the variable voltage dividing resistor 25 according to the adjustment point select signals (TES00, TES01, and TES10). The switch part supplies the selected voltage to the operational amplifier 22 through the line L8.

The operational amplifier 22 is a so-called voltage follower circuit, having its inverting input terminal and output terminal connected to each other. The operational amplifier 22 outputs the voltage on the line L8 through an external terminal PA of the semiconductor integrated chip as a temperature detection signal SENS.

The operation of the foregoing temperature detection circuit 1A will be described below.

Figure 7:
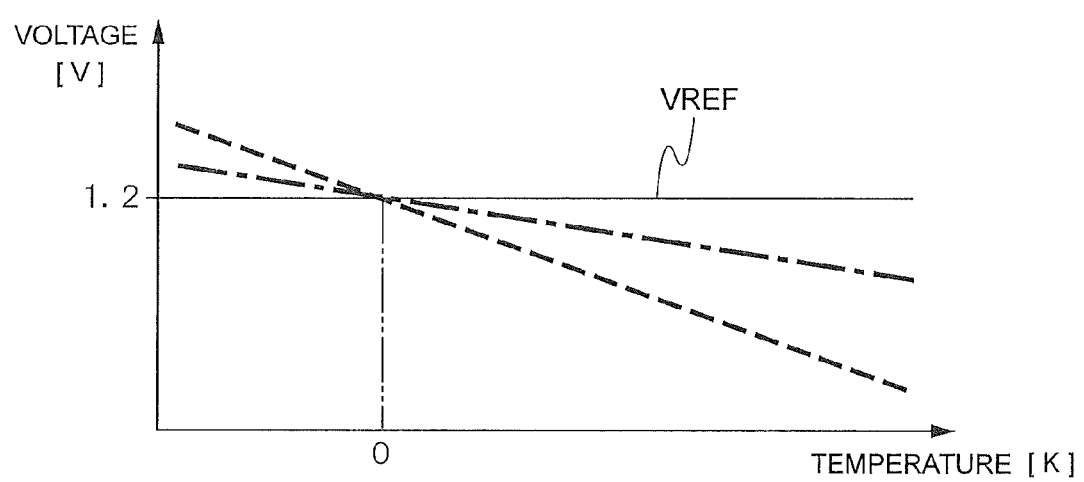
FIG. 7 is a chart showing an example of the reference voltage VREF and the temperature gradient characteristic.

For example, as shown by the dashed line and the dot-dashed line in FIG. 7, the voltages of the anode terminals of the respective diodes 11 and 12 shown in FIG. 6 are 1.2 V when the temperature of the semiconductor integrated chip itself is absolute zero. The voltages decrease with the increasing temperature. The temperature of the semiconductor integrated chip can thus be detected on the basis of the voltage of the anode terminal of the diode 11 or 12. In the temperature detection circuit 1A, the operational amplifier 21, switch element 24, and operational amplifier 22 constitute a temperature detection signal generation part. The temperature detection signal generation part generates the temperature detection signal SENS for indicating the temperature of the semiconductor integrated chip on the basis of the second divided voltage V2 which is the voltage on the anode terminal of the diode 12, divided by the variable voltage dividing resistor 25. The temperature detection signal generation part outputs the generated temperature detection signal SENS to outside.

In the meantime, the operational amplifier 20 serving as a reference voltage generation part sends out the reference voltage VREF. The reference voltage VREF is the differential voltage between the first divided voltage V1 obtained by dividing the voltage on the anode terminal of the diode 11 by the variable voltage dividing resistor 13 and the voltage on the anode terminal of the diode 12. The differential voltage is fed back to the inverting input terminal of the operational amplifier 20 through the resistor 16 and the variable voltage dividing resistor 13 and to the non-inverting input terminal of the operational amplifier 20 through the variable voltage dividing resistor 25. With such a configuration, the operational amplifier 20 operates to generate a feedback voltage as the reference voltage VREF such that the forward voltage (the voltage of the anode terminal) of the diode 12 becomes equal to the first divided voltage V1 which is obtained by dividing the forward voltage (the voltage of the anode terminal) of the diode 11. Since the diodes 11 and 12, or the first and second diodes, have respective different p-n junction areas, different amounts of current flow into the respective diodes 11 and 12. The degree of decrease of the forward voltage of the diode 12 due to a temperature increase is thus different from that of the forward voltage of the diode 11 due to the temperature increase. At absolute zero, both the diodes 11 and 12 have a forward voltage of 1.2 V. The difference between the forward voltage of the diode 12 and that of the diode 11 therefore represents the amount of voltage change because of a change in temperature. Using the amount of voltage change, the operational amplifier 20 can cancel the decreases of the forward voltages due to the temperature increase, and thereby generate a constant reference voltage VREF independent of temperature changes. Note that the reference voltage VREF has a value of 1.2 V which is the semiconductor band gap voltage at absolute zero (hereinafter, referred to as BGR voltage). As shown in FIG. 7, the reference voltage VREF is constantly 1.2 V independent of temperature changes of the semiconductor integrated chip.

The reference voltage VREF and the temperature detection signal SENS generated by the temperature detection circuit 1A can be used to detect an abnormal temperature caused by the semiconductor integrated chip. For example, a threshold voltage that indicates the upper limit temperature allowable as the temperature caused by the semiconductor integrated chip is generated on the basis of the reference voltage VREF (1.2 V). If the temperature detection signal SENS is higher than the threshold voltage, the temperature of the semiconductor integrated chip is determined to be a normal temperature range. If lower, the semiconductor integrated chip is determined to be in a state of abnormally high temperature.

An adjustment operation to be performed on a semiconductor integrated chip including the foregoing temperature detection circuit 1A at the time of factory shipment will be described below.

Figure 8:
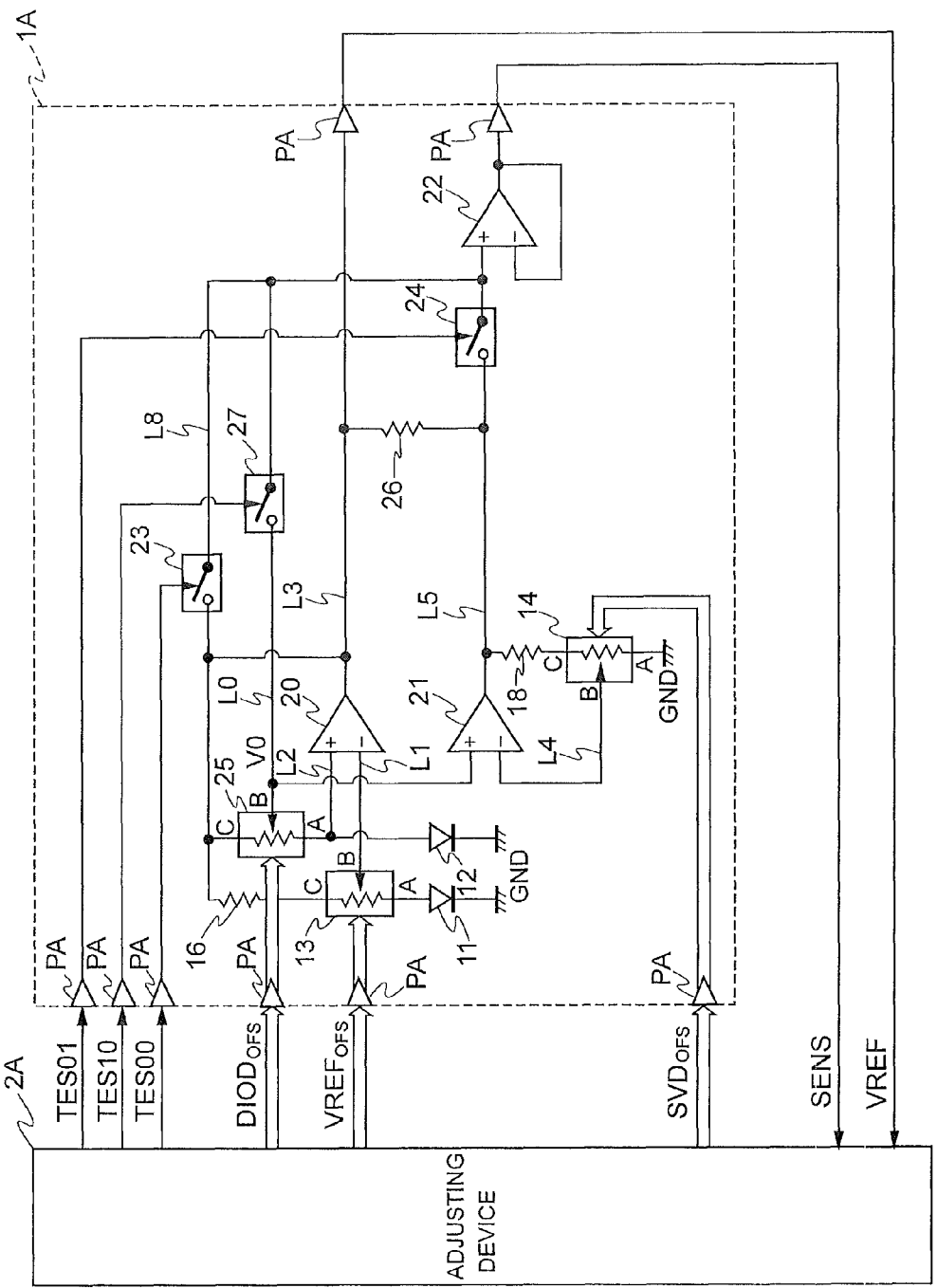
FIG. 8 is a diagram showing a system configuration for adjusting the temperature detection circuit 1A.

FIG. 8 is a block diagram including the system configuration for adjusting the temperature detection circuit 1A.

In the system configuration shown in FIG. 8, an adjusting device 2A is connected to the external terminals PA of the semiconductor integrated chip including the temperature detection circuit 1A.

Figure 9:
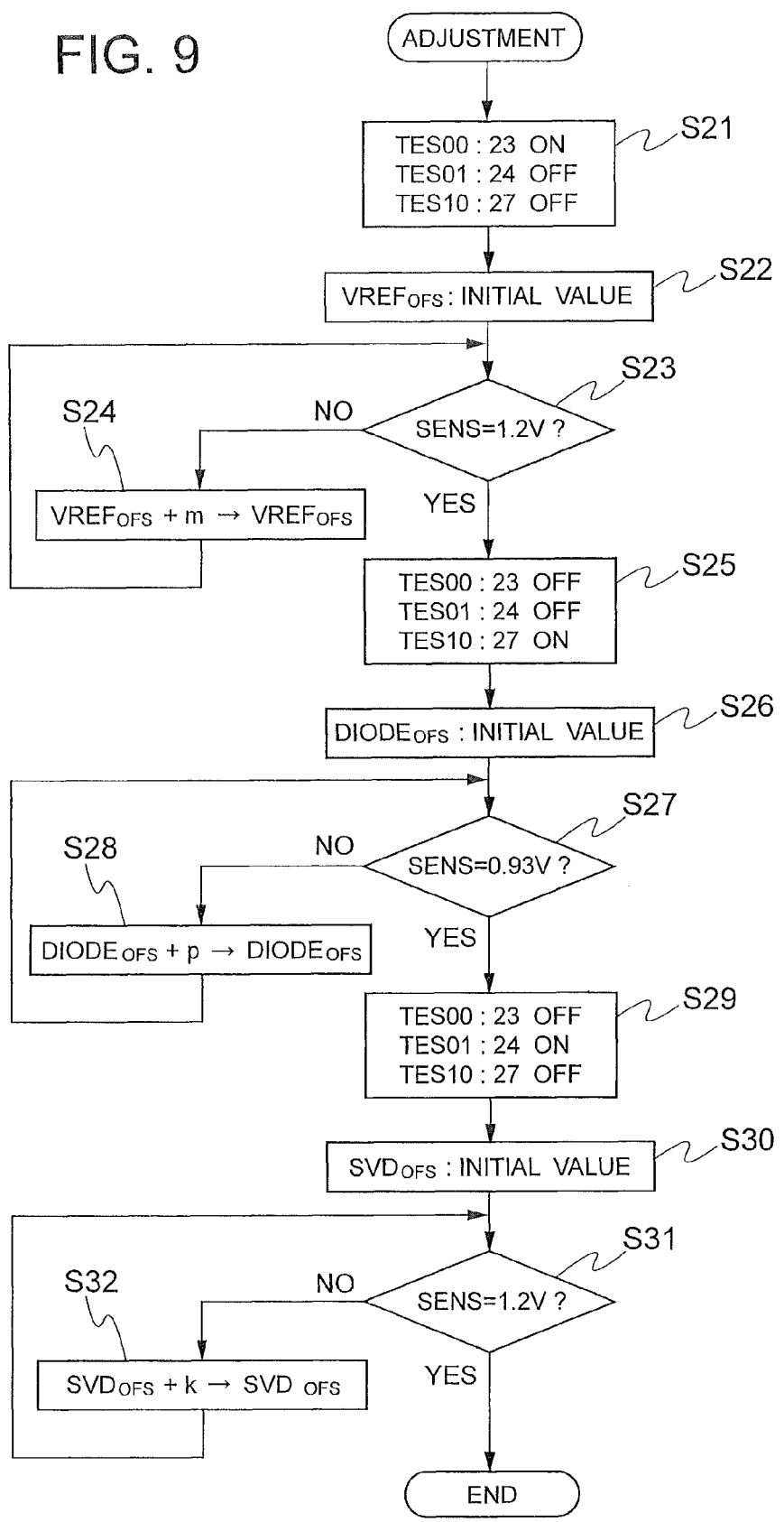
FIG. 9 is a flowchart showing an adjustment procedure to be performed by an adjusting device 2A.

The adjusting device 2A adjusts the temperature detection circuit 1A by a procedure according to an adjustment flow such as shown in FIG. 9, with the temperature of the semiconductor integrated chip itself maintained at a predetermined first temperature.

In FIG. 9, the adjusting device 2A initially supplies the temperature detection circuit 1A with the adjustment point select signal TES00 for setting the switch element 23 to the ON state and the adjustment point select signals TES01 and TES10 for setting both the switch elements 24 and 27 to the OFF state (step S21). By the execution of step S21, the voltage sent from the operational amplifier 20 of the temperature detection circuit 1A is supplied to the non-inverting input terminal of the operational amplifier 22 through the switch element 23.

Next, the adjusting device 2A supplies the temperature detection circuit 1A with the reference voltage offset adjustment signal $VREF_{OFS}$ that indicates an initial value as the reference offset value (step S22). According to the reference voltage offset adjustment signal $VREF_{OFS}$ indicating the initial value, the variable voltage dividing resistor 13 of the temperature detection circuit 1A sets the resistance across the terminals A and B or the resistance across the terminals B and C to zero, for example. By the execution of steps S21 and S22, the differential voltage sent from the operational amplifier 20 is supplied to the adjusting device 2A through the switch element 23 and the operational amplifier 22 as the temperature detection signal SENS.

Next, the adjusting device 2A determines whether the temperature detection signal SENS supplied from the temperature detection circuit 1A is equal to 1.2 V which is the BGR voltage at absolute zero (step S23). In step S23, if the temperature detection signal SENS is determined not to be 1.2 V, the adjusting device 2A adds a predetermined fixed value m to the reference offset value indicated by the reference voltage offset adjustment signal $VREF_{OFS}$, and supplies the resultant to the temperature detection circuit 1A as a new reference voltage offset adjustment signal $VREF_{OFS}$ (step S24). By the execution of step S24, the variable voltage dividing resistor 13 of the temperature detection circuit 1A changes the resistance ratio between the resistance across the terminals A and B and the resistance across the terminals B and C by an amount corresponding to the fixed value m.

After the execution of step S24, the adjusting device 2A returns to the execution of step S23 to repeat the foregoing operation. The repetitions of steps S23 and S24 gradually change the ratio between the resistance across the terminals A and B and the resistance across the terminals B and C of the variable voltage dividing resistor 13. As a result, the voltage value of the temperature detection signal SENS sent through the operational amplifier 20, the switch element 23, and the operational amplifier 22 gradually increases or decreases.

If, in step S23, the temperature detection signal SENS is determined to be equal to 1.2 V, the adjusting device 2A supplies the temperature detection circuit 1A with the adjustment point select signals TES00 and TES01 for setting the switch elements 23 and 24 to the OFF state and the adjustment point select signal TES10 for setting the switch element 27 to the ON state (step S25). By the execution of step S25, the second divided voltage V2 on the terminal B of the variable voltage dividing resistor 25 is supplied to the non-inverting input terminal of the operational amplifier 22 through the switch element 27.

Next, the adjusting device 2A supplies the temperature detection circuit 1A with the diode offset adjustment signal $DIOD_{OFS}$ that indicates an initial value as the diode offset value (step S26). According to the diode offset adjustment signal $DIOD_{OFS}$ indicating the initial value, the variable voltage dividing resistor 25 of the temperature detection circuit 1A sets the resistance across the terminals A and B or the resistance across the terminals B and C to zero, for example. By the execution of steps S25 and S26, the second divided voltage V2 on the line L0, obtained by adjusting the voltage on the anode terminal of the diode 12 by the variable voltage dividing resistor 25, is supplied to the adjusting device 2A through the switch element 27 and the operational amplifier 22 as the temperature detection signal SENS.

Next, the adjusting device 2A determines whether the temperature detection signal SENS indicating the second divided voltage V2 on the line L0 has a desired temperature gradient voltage such as 0.93 V (step S27). The temperature gradient voltage is a voltage that indicates a temperature gradient characteristic expressing the degree of voltage change of the second divided voltage V2 on the line L0 due to a temperature transition. The temperature gradient is given by:

$$(1.2-Vn)/(Tc-(-273)) [V/° C.],$$

where Vn is the temperature gradient voltage to be set at a temperature Tc.

If, in the foregoing step S27, the temperature detection signal SENS is determined not to be 0.93 V which indicates the desired temperature gradient characteristic, the adjusting device 2A adds a predetermined fixed value p to the diode offset value indicted by the diode offset adjustment signal $DIOD_{OFS}$, and supplies the resultant to the temperature detection circuit 1A as a new diode offset adjustment signal $DIOD_{OFS}$ (step S28). By the execution of step S28, the variable voltage dividing resistor 25 of the temperature detection circuit 1A changes the resistance ratio between the resistance across the terminals A and B and the resistance across the terminals B and C by an amount corresponding to the fixed value p. The smaller the resistance across the terminals A and B of the variable voltage dividing resistor 25 is in comparison to the resistance across the terminals B and C, the gentler the temperature gradient is as shown by the dot-dashed line in FIG. 7. The greater the resistance across the terminals A and B of the variable voltage dividing resistor 25 is in comparison to the resistance across the terminals B and C, the steeper the temperature gradient is as shown by the dashed line in FIG. 7. In short, the variable voltage dividing resistor 25 adjusts the voltage of the anode terminal of the diode 12 on the basis of the diode offset adjustment signal $DIOD_{OFS}$, whereby the temperature gradient characteristic of the second divided voltage V2 on the line L0 can be modified.

After the execution of step S28, the adjusting device 2A returns to the execution of step S27 to repeat the foregoing operation. The repetitions of steps S27 and S28 gradually change the ratio between the resistance across the terminals A and B and the resistance across the terminals B and C of the variable voltage dividing resistor 25. As a result, the voltage value of the temperature detection signal SENS corresponding to the second divided voltage V2 on the line L0 gradually increases or decreases.

Now, if in step S27 the temperature detection signal SENS is determined to be equal to 0.93 V, the adjusting device 2A supplies the temperature detection circuit 1A with the adjustment point select signals TES00 and TES10 for setting the switch elements 23 and 27 to the OFF state and the adjustment point select signal TES01 for setting the switch element 24 to the ON state (step S29). By the execution of step S29, the amplified voltage sent from the operational amplifier 21 is supplied to the non-inverting input terminal of the operational amplifier 22 through the switch element 24.

Next, the adjusting device 2A supplies the temperature detection circuit 1A with the temperature detection offset adjustment signal $SVD_{OFS}$ that indicates an initial value as the sensor offset value (step S30). According to the temperature detection offset adjustment signal $SVD_{OFS}$ indicating the initial value, the variable voltage dividing resistor 14 of the temperature detection circuit 1A sets the resistance across the terminals A and B or the resistance across the terminals B and C to zero, for example. By the execution of steps S29 and S30, the amplified voltage sent from the operational amplifier 21 is supplied to the adjusting device 2A through the switch element 24 and the operational amplifier 22 as the temperature detection signal SENS. Here, the operational amplifier 21 amplifies the second voltage V2 on the line L0 by the gain based on the resistance of the variable voltage dividing resistor 14, set by the temperature detection offset adjustment signal $SVD_{OFS}$, and the resistor 18.

Next, the adjusting device 2A determines whether the temperature detection signal SENS supplied from the temperature detection circuit 1A is equal to 1.2 V, the BGR voltage (step S31). In step S31, if the temperature detection signal SENS is determined not to be 1.2 V, the adjusting device 2A adds a predetermined fixed value k to the value indicated by the temperature detection offset adjustment signal $SVD_{OFS}$, and supplies the resultant to the temperature detection circuit 1A as a new temperature detection offset adjustment signal $SVD_{OFS}$ (step S32). By the execution of step S32, the variable voltage dividing resistor 14 of the temperature detection circuit 1A changes the resistance ratio between the resistance across the terminals A and B and the resistance across the terminals B and C by an amount corresponding to the fixed value k. This increases or decreases the gain of the operational amplifier 21, and the value of the temperature detection signal SENS increases or decreases accordingly. The temperature gradient of the temperature detection signal SENS here is given by:

$$[(1.2-V2)/(Tc-(-273))]\times[(R2+VR3)/VR3],$$

where
V2: second divided voltage,
R2: the resistance of the resistor 18,
VR3: the resistance across the terminals B and C of the variable voltage dividing resistor 14, and
Tc: temperature.

After the execution of step S32, the adjusting device 2A returns to the execution of step S31 to repeat the foregoing operation. The repetitions of steps S31 and S32 gradually increase or decrease the gain of the operational amplifier 21, and the value of the temperature detection signal SENS gradually increases or decreases accordingly.

Assuming that the amount of change of the reference voltage VREF due to manufacturing variations is ΔVREF, the amount of change ΔV2 of the second divided voltage V2 on the line L0 is expressed by:

$$\Delta V2=[(V2-V_A)/(VREF-V_A)]\times \Delta VREF,$$

where $V_A$: the voltage of the line L2.

The amplified voltage sent from the operational amplifier 21 to the line L5 will be referred to as a voltage V5. Since the voltage V5 is normalized to the reference voltage VREF yet to be changed, the voltage change of the voltage V5 is also multiplied by VREF/V2.

More specifically, the amount of change ΔV5 of the voltage V5 on the line L5 is given by:

$$\Delta V5=[((V2-V_A)/(VREF-V_A))\times(VREF/V2)]\times \Delta VREF.$$

For example, if VREF=1.2, V2=0.9, and $V_A$=0.6, then $$\Delta V5=(\tfrac{2}{3})\times \Delta VREF.$$

If in step S31 the temperature detection signal SENS is determined to be equal to 1.2 V, the adjusting device 2A ends the adjustment processing shown in FIG. 9.

As described above, the temperature detection circuit 1A shown in FIG. 6 includes the first variable voltage dividing resistor 13. The first variable voltage dividing resistor 13 supplies the first divided voltage V1, obtained by dividing the forward voltage (the voltage of the anode terminal) of the diode 11 according to the reference voltage offset adjustment signal $VREF_{OFS}$, to the operational amplifier 20 in order to make the value of the reference voltage VREF generated by the operational amplifier 20 coincide with the BGR voltage (1.2 V). Consequently, even if the characteristics of the modules vary due to manufacturing variations, the fixed reference voltage VREF of 1.2 V can be generated with high accuracy.

The temperature detection circuit 1A shown in FIG. 6 also includes the second variable voltage dividing resistor 25. The second variable voltage dividing resistor 25 adjusts the forward voltage (the voltage of the anode terminal) of the diode 12 by the dividing resistance ratio according to the diode offset adjustment signal $DIOD_{OFS}$, thereby arbitrarily setting the temperature gradient of the temperature detection signal SENS, i.e., the degree of voltage change to follow a temperature increase (decrease). This allows an arbitrary setting of the detection sensitivity to a temperature change of the semiconductor integrated chip.

In the temperature detection circuit 1A shown in FIG. 6, the operational amplifier 21 amplifies the forward voltage of the diode 12 serving as the generation source of the BGR voltage, whereby the temperature detection signal SENS to follow the temperature of the semiconductor integrated chip is generated. The temperature detection circuit 1A includes the third variable voltage dividing resistor 14 which changes the gain of the operational amplifier 21 according to the temperature detection offset adjustment signal $SVD_{OFS}$, thereby adjusting the level of the temperature detection signal SENS. By the adjustment of the third variable voltage dividing resistor 14, a highly accurate temperature detection signal SENS to follow the temperature of the semiconductor integrated chip can be generated even if the characteristics of the respective modules vary due to manufacturing variations.

The terminal voltages of the diodes 11 and 12 may vary with a change of the manufacturing process like a reduction in chip size. Even in such a case, the temperature detection circuit 1A shown in FIG. 6 can generate a reference voltage VREF and a temperature detection signal SENS having desired characteristics by simply adjusting the dividing resistance ratios of the variable voltage dividing resistors 13 and 25. According to the temperature detection circuit 1A shown in FIG. 6, adjustments can be easily made as compared to when the modification of the resistance of the resistor 17 is needed aside from the adjustment of the resistances of the variable voltage dividing resistors 13 and 14 like the temperature detection circuit 1 shown in FIG. 1.

In the temperature detection circuit 1A shown in FIG. 6, the variable voltage dividing resistor 25 adjusts the forward voltage of the diode 12 to change the temperature gradient characteristic pertaining to the temperature detection sensitivity. On the other hand, in the temperature detection circuit 1 shown in FIG. 1, the variable voltage dividing resistor 15 adjusts the division ratio of the voltage between the lines L3 and L5 to change the temperature gradient characteristic pertaining to the temperature detection sensitivity. According to the temperature detection circuit 1 shown in FIG. 1, the lines L3 and L5 both have a voltage of 1.2 V, in which state the temperature detection signal SENS is fixed to zero and fails to be adjusted in step S11 shown in FIG. 5. In order for the temperature detection circuit 1 shown in FIG. 1 to make such an adjustment, the temperature of the semiconductor integrated chip is changed from the first temperature to the second temperature. In contrast, the temperature detection circuit 1A shown in FIG. 6 can make all the adjustments without changing the temperature of the semiconductor integrated chip. This can reduce the adjustment time as compared to the temperature detection circuit 1 shown in FIG. 1.

Figure 10:
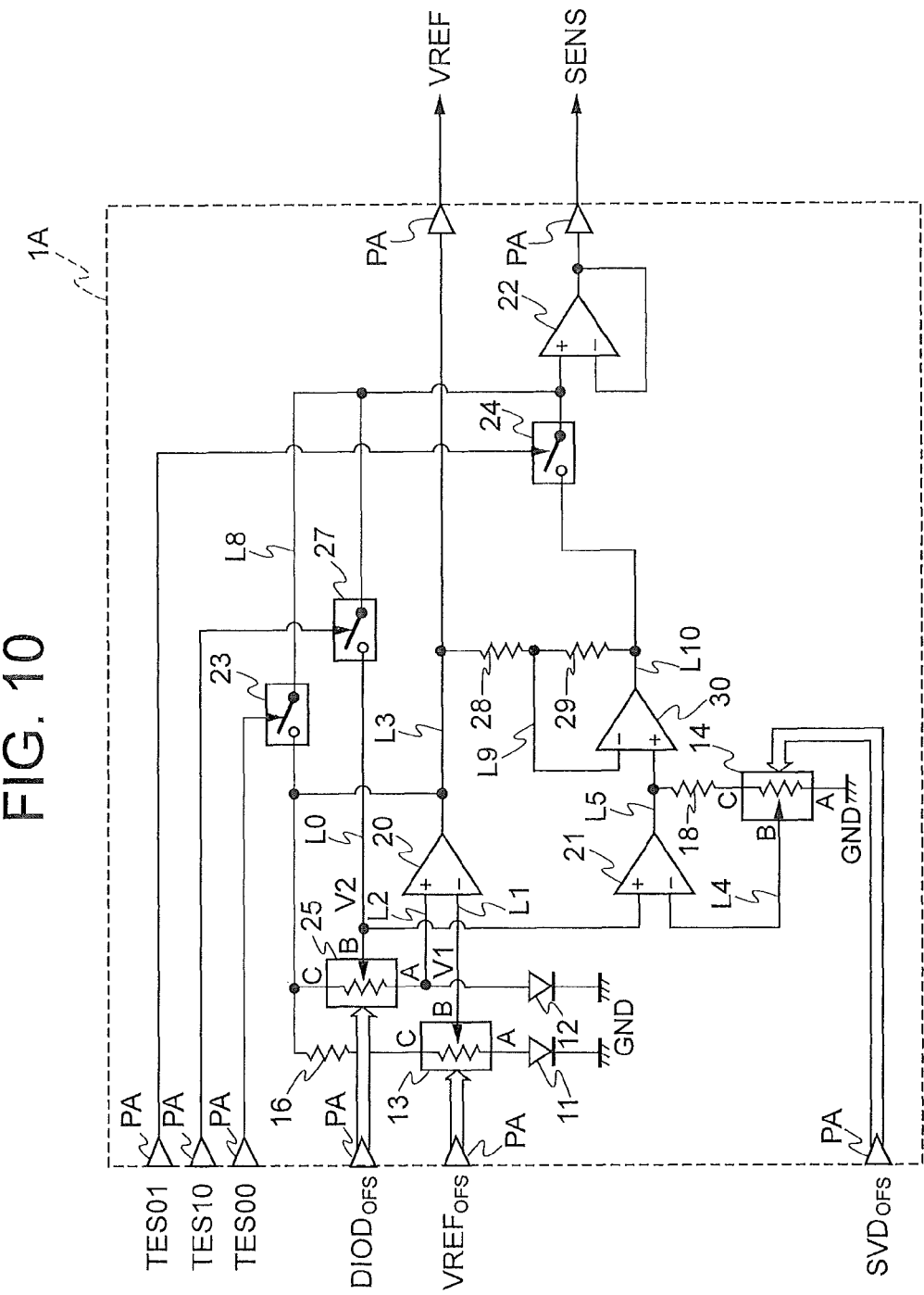
FIG. 10 is a circuit diagram showing a modification of the temperature detection circuit 1A shown in FIG. 6.

As shown in FIG. 10, resistors 28 and 29 and an operational amplifier 30 may be arranged between the operational amplifier 21 and the switch element 24 of the temperature detection circuit 1A. In other words, the operational amplifier 21 intended for offset adjustment, serving as a first amplifier, and the operational amplifier 30 for increasing the temperature gradient, serving as a second amplifier, constitute the amplification part for amplifying the second divided voltage V2.

According to the configuration shown in FIG. 10, the operational amplifier 21 supplies the amplified voltage to the non-inverting input terminal of the operational amplifier 30 through the line L5. The inverting input terminal of the operational amplifier 30 is connected to one of the terminals of each of the resistors 28 and 29 through a line L9. The output terminal of the operational amplifier 30 is connected to the other terminal of the resistor 29 and the switch element 24 through a line L10. The other terminal of the resistor 28 is connected to the line L3. The operational amplifier 30 amplifies the voltage sent from the operational amplifier 21 through the line L5 by a gain corresponding to the resistance ratio between the resistors 28 and 29, and supplies the amplified voltage to the switch element 24 through the line L10. The temperature gradient set by the variable voltage dividing resistor 25 as described above can thus be modified by the gain of the operational amplifier 30 based on the ratio between the resistances of the resistors 28 and 29. The temperature gradient of the voltage sent from the operational amplifier 30 to the line L10 is given by:

$$[((1.2-V2)/(Tc-(-273))] \times [((R2+VR3)/VR3)] \times [(R3+R4)/R3],$$

where R3: the resistance of the resistor 28, and

R4: the resistance of the resistor 29.

In other words, R3 and R4 seen above can be set to 1:2 or above to increase the gain of the operational amplifier 30. The higher the gain of the operational amplifier 30, the steeper the temperature gradient and the higher the temperature detection sensitivity. When R3 and R4 are set to 1:2, the amount of change of the voltage sent from the operational amplifier 30 becomes zero.

Now, suppose that the p-n junction areas of the diodes (11 and 12) serving as the generation source of the BGR voltage are reduced for circuit miniaturization. Since the voltages of the anode terminals increase, the variable voltage dividing resistor 15 arranged between the lines L3 and L5 shown in FIG. 1 is not able to produce a steep temperature gradient. The provision of the amplification stage including the resistors 28 and 29 and the operational amplifier 30 between the operational amplifier 21 and the switch element 24 as shown in FIG. 10 can produce a steep temperature gradient.

Figure 11:
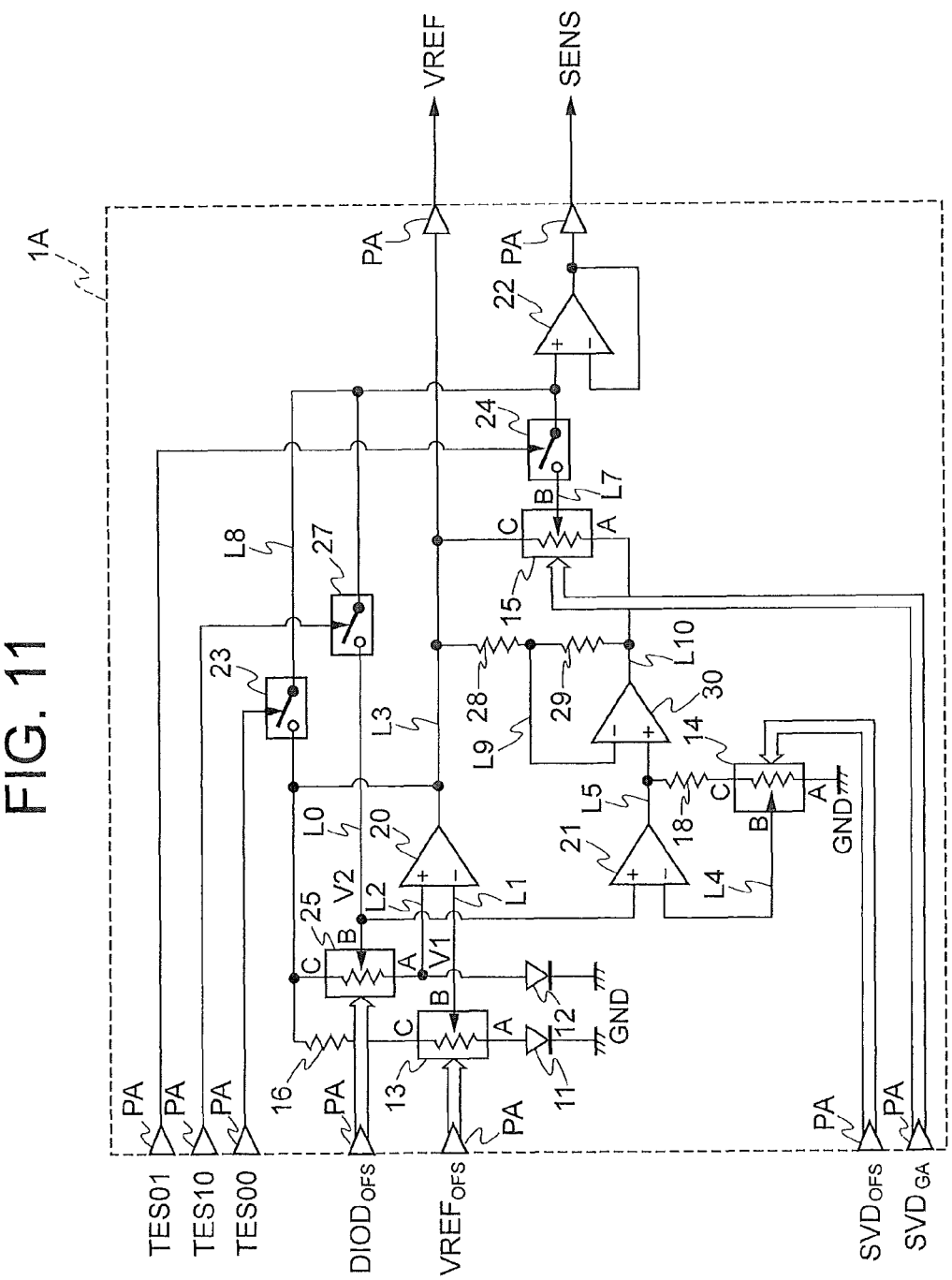
FIG. 11 is a circuit diagram showing another modification of the temperature detection circuit 1A shown in FIG. 6.

As shown in FIG. 11, the foregoing variable voltage dividing resistor 15 may be arranged between the amplification stage and the switch element 24 so that the temperature gradient can be fine adjusted.

According to the configuration shown in FIG. 11, the amplified voltage sent from the operational amplifier 30 is supplied to the terminal A of the variable voltage dividing resistor 15 through the line L10. The terminal C of the variable voltage dividing resistor 15 is connected to the line L3, and the terminal B is connected with one of the terminals of the switch element 24 through the line L7. The variable voltage dividing resistor 15 changes the resistance ratio between the resistance across the terminals A and B and the resistance across the terminals B and C on the basis of a temperature gradient adjustment value. The temperature gradient adjustment value is indicated by the temperature gradient adjustment signal $SVD_{GA}$ which is supplied through an external terminal PA of the semiconductor integrated chip. The variable voltage dividing resistor 15 adjusts the value of the amplified voltage sent from the operational amplifier 30 according to the temperature gradient adjustment signal $SVD_{GA}$, and supplies the resultant to the switch element 24 through the line L7. The other end of the switch element 24 is connected to the non-inverting input terminal of the operational amplifier 22 and the switch elements 23 and 27 through the line L8.

The fine adjustment to the temperature gradient by the variable voltage dividing resistor 15 is made after the end of the adjustment shown in FIG. 9 and after the temperature of the semiconductor integrated chip is changed. In other words, the temperature is changed and then the second adjustment shown in FIG. 5 is performed. In step S10 shown in FIG. 5, the adjustment point select signal TES10 for setting the switch element 27 to the OFF state is supplied to the temperature detection circuit 1A.

While the temperature detection circuits 1A shown in FIGS. 6, 10, and 11 use the p-n junction diodes 11 and 12 as the elements to be the source for generating the BGR voltage, p-n junction transistors may be used instead. It is only essential that p-n junction semiconductor elements subject to band gap energy be used as the elements to be the source of generation of the BGR voltage.

In the foregoing embodiment, the value of the temperature detection signal SENS is adjusted to coincide with 1.2 V in step S31 of FIG. 9. However, the temperature detection signal SENS may be adjusted to fall within the range of 1.15 to 1.25 V.

This application is based on Japanese Patent Application No. 2011-247732 which is herein incorporated by reference.

What is claimed is:

1. A temperature detection circuit for generating a temperature detection signal indicating a temperature of a semiconductor, comprising:
    first and second diodes having respective p-n junctions independent from each other;
    a first current path including a first variable voltage dividing resistor that is connected in series to the first diode and whose dividing resistance ratio is variable according to a first offset adjustment signal, the first variable voltage dividing resistor producing a first divided voltage;
    a second current path including a second variable voltage dividing resistor that is connected in series to the second diode and whose dividing resistance ratio is variable according to a second offset adjustment signal, the second variable voltage dividing resistor producing a second divided voltage, the second current path having a node between the second diode and the second variable voltage dividing resistor;
    a reference voltage generation part that includes first and second input terminals and that generates a differential voltage from the first divided voltage applied to the first input terminal and a potential at the node in the second current path that is applied to the second input terminal, the reference voltage generation part applying the differential voltage to an end of the first current path and also to an end of the second current path and additionally outputting the differential voltage as a reference voltage, the differential voltage indicating a difference between the first divided voltage produced by the first variable voltage dividing resistor and the potential at the node in the second current path; and
    a temperature detection signal generation part that generates the temperature detection signal, the temperature detection signal generation part receiving the second divided voltage produced by the second variable voltage dividing resistor, the temperature detection signal generation part including an amplification part that amplifies the second divided voltage to obtain an amplified voltage and a third variable voltage dividing resistor that adjusts a gain of the amplification part according to a third offset adjustment signal; and
    a fourth variable voltage dividing resistor that adjusts a level of the amplified voltage output from the second amplifier according to a temperature gradient adjustment signal.

2. The temperature detection circuit according to claim 1, wherein the first and second diodes have respective different p-n junction areas.

3. The temperature detection circuit according to claim 2, further comprising a switch part that selects one of the differential voltage, the amplified voltage, and the second divided voltage according to an adjustment point select signal, and outputs the selected one through an output terminal of the temperature detection signal.

4. The temperature detection circuit according to claim 1, further comprising a switch part that selects one of the differential voltage, the amplified voltage, and the second divided voltage according to an adjustment point select signal, and outputs the selected one through an output terminal of the temperature detection signal.

5. The temperature detection circuit according to claim 4, wherein
    the amplification part includes:
    a first amplifier that amplifies the second divided voltage by a gain according to the third offset adjustment signal; and
    a second amplifier that supplies a voltage output from the first amplifier to the switch part as the amplified voltage.

6. The temperature detection circuit according to claim 3, wherein
    the amplification part includes:
    a first amplifier that amplifies the second divided voltage by a gain according to the third offset adjustment signal; and
    a second amplifier that supplies a voltage output from the first amplifier to the switch part as the amplified voltage.

7. A method of adjusting the temperature detection circuit as set forth in claim 1, the method comprising:
    a first step of changing a level of the first offset adjustment signal to make the reference voltage coincide with a predetermined first voltage;
    a second step of changing a level of the second offset adjustment signal to make the second divided voltage coincide with a predetermined second voltage; and
    a third step of changing a level of the third offset adjustment signal to make a level of the temperature detection signal coincide with a predetermined third voltage.

* * * * *